United States Patent
Ossenkopp et al.

(10) Patent No.: US 7,770,280 B2
(45) Date of Patent: Aug. 10, 2010

(54) METHOD FOR PRODUCING COILS AND COIL CIRCUITS

(75) Inventors: Stefan Ossenkopp, Harsum (DE); Martin Ermer, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 283 days.

(21) Appl. No.: 10/530,908

(22) PCT Filed: Feb. 9, 2004

(86) PCT No.: PCT/DE2004/000214

§ 371 (c)(1),
(2), (4) Date: Apr. 8, 2005

(87) PCT Pub. No.: WO2004/088824

PCT Pub. Date: Oct. 14, 2004

(65) Prior Publication Data

US 2006/0001327 A1  Jan. 5, 2006

(30) Foreign Application Priority Data

Apr. 3, 2003  (DE) .................................. 103 15 361

(51) Int. Cl.
*H02K 15/04* (2006.01)
*H02K 15/085* (2006.01)
(52) U.S. Cl. ..................... 29/596; 29/606; 310/201
(58) Field of Classification Search ................... 29/596, 29/598, 605, 606; 310/71, 179, 184, 201
See application file for complete search history.

(56) References Cited

U.S. PATENT DOCUMENTS 5,508,571 A * 4/1996 Shafer, Jr. .................... 310/71

| | | | |
|---|---|---|---|
| 6,339,871 B1 * | 1/2002 | Maesoba et al. | 29/596 |
| 6,707,211 B2 * | 3/2004 | Oohashi et al. | 310/179 |
| 2002/0067094 A1 | 6/2002 | Megata et al. | |
| 2003/0015932 A1 | 1/2003 | Adachi et al. | |

FOREIGN PATENT DOCUMENTS

| | | |
|---|---|---|
| DE | 40 31 276 A | 4/1993 |
| DE | 43 39 384 A | 5/1995 |
| JP | 2000350423 | 12/2000 |
| JP | 2001025198 | 1/2001 |
| JP | 2003032933 | 1/2003 |

OTHER PUBLICATIONS

"Technology of Electric Machine Engineering" by R. Tzscheutschler et al, Verlag Technik GMBH, Berlin, p. 336.

* cited by examiner

*Primary Examiner*—A. Dexter Tugbang
*Assistant Examiner*—Livius R Cazan
(74) *Attorney, Agent, or Firm*—Michael J. Striker

(57) ABSTRACT

A method for manufacturing multiphase windings (32) of an electric machine provides the following process steps: Cross-sectional profiles (13) that increase the slot space factor are stamped onto wire elements (7, 11, 12). Offsetting dies (14, 26) are loaded with stamped wire elements (7) to constitute the winding (32), stamped wire elements (11) to constitute an integrated star point (21), and stamped wire elements (12) for supplying current to the winding (32). The offsetting dies (14, 26) offset the stamped wire elements (7, 11, 12) in their end regions. An interconnection of the integrated star point (21) is produced by thermally attaching (30) the stamped wire elements (11) for the integrated star point (21) to a connecting ring (40) on an inside (41) of a finished winding head (20).

8 Claims, 7 Drawing Sheets

METHOD FOR PRODUCING COILS AND COIL CIRCUITS

CROSS-REFERENCE

The invention described and claimed hereinbelow is also described in PCT/DE 2004/000214, filed Feb. 9, 2004 and DE 103 15 361.6, filed Apr. 3, 2003. This German Patent Application, whose subject matter is incorporated here by reference, provides the basis for a claim of priority of invention under 35 U.S.C. 119 (a)-(d).

BACKGROUND OF THE INVENTION

Windings for electric machines such as asynchronous motors can be manufactured by means of the threading technique. In the manufacture of windings for electric machines, the threading technique is used for low-voltage motors operated at voltages below 50 V and in electric motors operated with higher voltages. When manufacturing windings for low-voltage motors (operating voltage=to 50 V), the windings are manufactured out of parallel wires in order to assure the required winding cross section.

Low-voltage motors that are operated with operating voltages below 50 V are used in steering motors for vehicles or for actuators used in vehicles. Electrical systems in motor vehicles today are generally designed as 12 V electrical systems; judging from current development trends, the use of 42 V electrical systems in motor vehicles could conceivably become the new standard. Both electrical system voltages, i.e. an electrical system voltage of 12 V and an electrical system voltage of 42 V, permit the use of low-voltage motors embodied in the form of asynchronous motors, which can be operated with an operating voltage of=50 V. The windings of low-voltage motors are produced from parallel wires in order to assure the winding cross section that these electric machines require. But producing windings for low-voltage motors, e.g. asynchronous motors, out of parallel individual wires results in a high degree of wiring complexity at the ends of the winding, which is generally manufactured by hand.

The windings for asynchronous motors manufactured out of parallel wires using the threading technique also have the disadvantage that the threading technique permits only a low slot space factor to be achieved. Because of the low level of utilization of the slots into which the parallel wires are inserted, in order to achieve sufficient winding cross sections, a larger number of slots are required, which in turn requires a large structural volume in electrical machines that can be operated in the low-voltage range below 50 V, for example of the kind represented by asynchronous motors used as steering motors.

When manufacturing DC motors, it is also known to use the plugging technique to manufacture winding cores.

According to the threading technique, see "Technologie des Elektromaschinenbau's" [Technology of Electric Machine Engineering] by R. Tzscheutschler, H. Olbrich, and W. Jordan, Verlag Technik GmbH, Berlin, p. 336, Technological Principles For Manufacturing Windings, loose prewound coils of enameled copper wire are inserted into half-closed slots. The threading process is used to wind stators. Depending on the stroke speed of a hydraulic cylinder and the stator core length, a coil side, a coil, or even an entire winding can be threaded in a slot-filling manner; it is also possible to insert cover insulating caps at the same time. The fundamental principle is based on the fact that the coil sides are narrowed to less than the slot width and protected from the slot edges in order to be threaded into the slots through the exertion of force on the front end by means of a stroke motion. The alignment of the wires and the protection from the slot edges can be achieved by means of polished steel profiles that are also referred to as threading needles. In the threading tool, the threading needles are adapted to a particular stator plate cut and to the core length. The coils are wound or suspended in accordance with the winding scheme.

At the end of the threading process, it is typical for the layer of threaded coils to be S-shaped in the longitudinal section of the stator. In addition, the coils often are not centered in relation to the stator. At the point at which they emerge, the coil ends bridge over the bore space in a sinuous fashion, which occurs to a particularly pronounced degree in bipolar windings. Additional threading procedures thus require intermediate shaping operations.

The threading method can be used to produce 1-phase 2-phase, and 3-phase windings with an arbitrary number of poles. Preferably, they are embodied in the form of single-layer windings with flat arrangements of the winding heads. Two-layer windings can be produced in two threading steps; a covering cap profile should be used for intermediate insulation.

SUMMARY OF THE INVENTION

The method proposed according to the present invention for manufacturing 3-phase windings with interconnection can be used to achieve high slot space factors, which can only be achieved to a limited degree using the threading technique. Due to the high slot space factors that can be achieved, it is possible to reduce the structural volume of 3-phase windings produced using the method according to the present invention. Moreover, using the method proposed according to the present invention, makes it possible to achieve an automatable manufacture of the windings. Integrally joining the interconnection of the star point to one side of a stator of an electric machine makes it possible to eliminate the previously required separate, manually executed work steps when manufacturing 3-phase windings. The interconnection of the star point can be integrated into the manufacture of the 3-phase windings, thus permitting the achievement of an automatable manufacture of the winding on the one hand and an automatable manufacture of the star point during the same manufacturing process on the other.

Another advantage of the method proposed according to present invention is that it permits the achievement of a compact star point arrangement with a minimized structural volume since the manufacture of the star point can be carried out in the course of the same manufacturing process, on one and the same tool-mounting socket. In addition to the integration of the interconnection of the star point arrangement, the method proposed according to the present invention permits wire elements that are stamped with a wedge shape to be used in the shaping of the winding head. Wire elements that are stamped with a wedge shape can be advantageously used to achieve an improved utilization of the slot to increase the slot space factor of an electric machine. This in turn permits an increase in the specific output per unit of structural volume of an electric machine.

As a rule, 3-phase windings or rectangular wire windings are manufactured out of stamped round wire shaped elements that can be embodied in the form of U-shaped elements, straight phase wires, an endless wire when using the threading technique, or straight star point wires provided with an offset.

According to the method proposed according to present invention, the round wire is first stamped or rolled into a wedge shape. In another work step of the method proposed according to present invention, the wires are positioned in a device for shaping the winding. The star wires, phase wires, and U-shaped elements are inserted at appropriate positions and the winding head to be produced is shaped into a compact form through a subsequent offsetting of the winding templates in relation to each other. The wire cage thus produced is slid into a prepared laminated core by means of an insertion apparatus; the prepared core can either contain paper insulation or an insulation has been produced by means of powder coating.

An offsetting on the opposite side yields a winding pitch. After the conductor elements are attached by means of a thermal joining process, for example by means of resistance welding, laser beam welding, electron beam welding, or soldering, an automatic contacting of the star point is executed. In addition to using an integral joining method to attach the conductor elements, they can also be attached by means of hot pressing or by means of a cold contacting technique such as riveting or crimping.

BRIEF DESCRIPTION OF THE DRAWINGS

The present invention will be described in greater detail below in conjunction with the drawings.

DETAILED DESCRIPTION OF THE PREFERRED EMBODIMENTS

Figure 1:
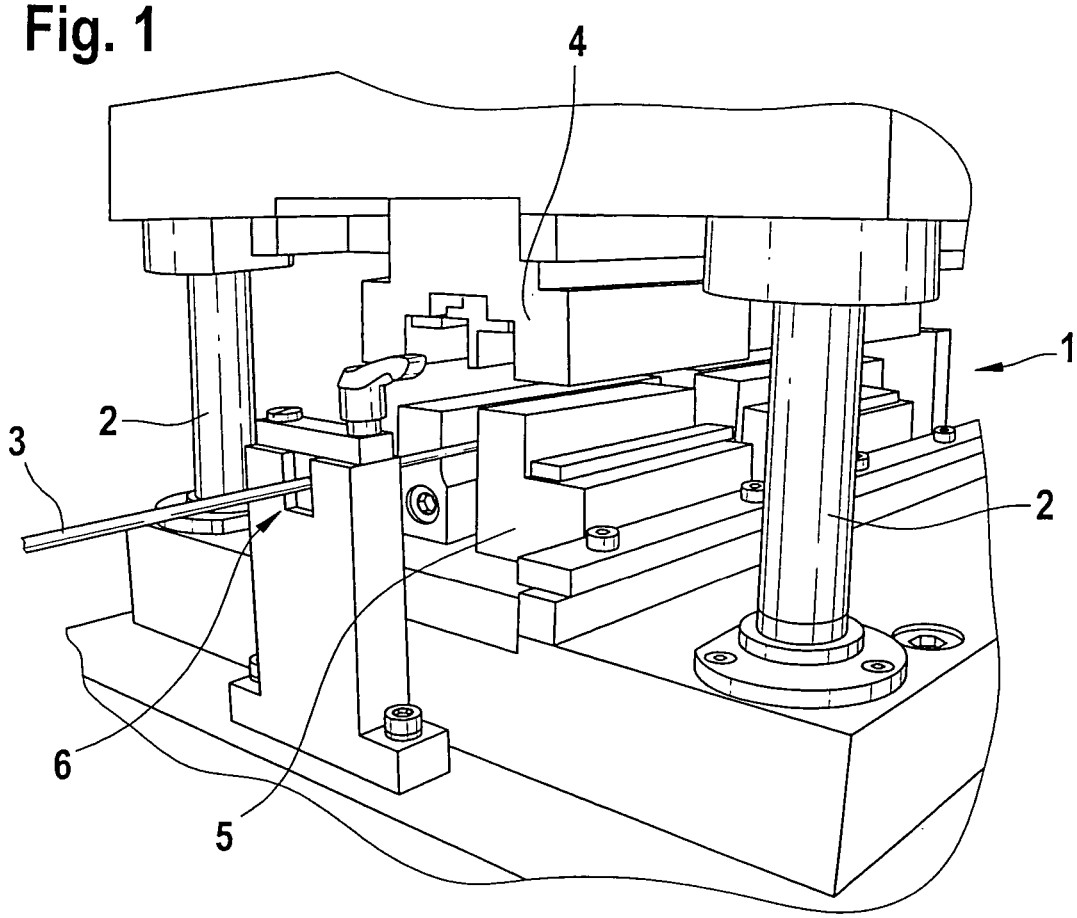
FIG. 1 shows a stamping device for shaping winding wires.

FIG. 1 shows a stamping device for shaping wire elements used as winding material.

A stamping die 1 schematically depicted in FIG. 1 is used to deform a wire material that is supplied in a rod-shaped form. The wire material 3 supplied in a rod-shaped form travels through a material inlet 6 to the region between a first shaping part 4 and a second shaping part 5. The two shaping parts 4, 5 are accommodated in stamping parts of the stamping die 1, which can be moved toward or away from each other by means of hydraulic pistons 2. Instead of hydraulic pistons 2, it is also possible to use pneumatic cylinders or electric drive units to move the shaping parts 4, 5 toward or away from each other. In accordance with the design of the first shaping part 4 and the second shaping part 5, which is complementary to the shape of the first shaping part 4, a wedge shape 13, for example, can be stamped onto the rod-shaped wire material 3 traveling into the stamping die 1 via the material inlet 6 (see FIG. 2).

In addition to the wedge shape 13, the stamping die 1 can also stamp the incoming rod-shaped wire material 3 into a different geometry, which increases the slot space factor of slots in an electrical machine.

Figure 2A:
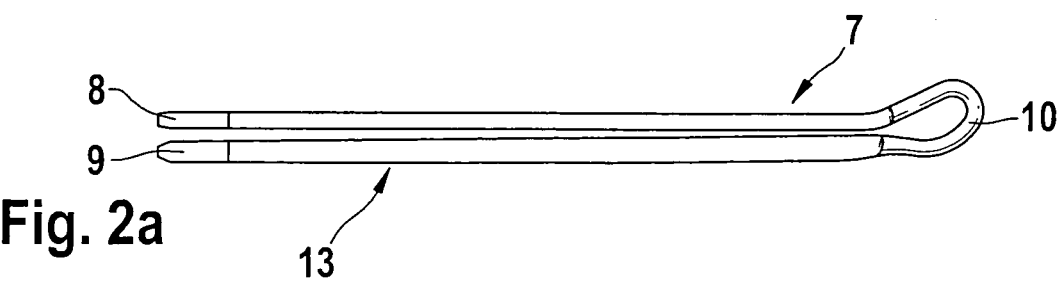
FIGS. 2a, 2b and 2c show various embodiment variants of wire elements for manufacturing windings.
Figure 2B:
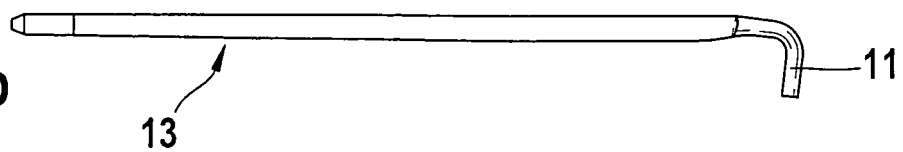
Figure 2C:
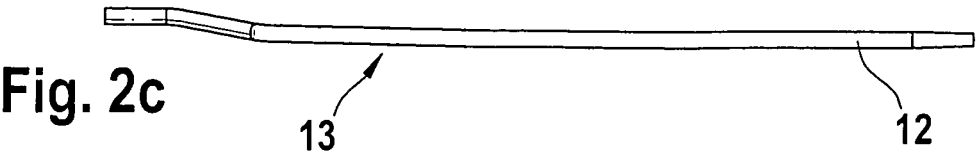

FIGS. 2a, 2b and 2c show various embodiment variants of wire elements for manufacturing multiphase windings.

According to FIG. 2a, a U-shaped element 7, which has passed through the stamping die 1 shown in FIG. 1 before a bending process and is therefore provided with a wedge shape 13 in the region of both of its legs, is bent at a rounded part 10 so that the two legs of the U-shaped element 7 respectively end at a first wire end 8 and a second wire end 9. In the subsequent manufacture of a winding 32 (see FIGS. 6 and 7), the rounded parts 10 are situated on the outside of a star point side, whereas the wire ends 8, 9 are situated on the connection side of the winding 32. In the production of the U-shaped elements 7, a bending step can occur first, followed by a stamping step, but the production sequence can also occur in the reverse order. The above-mentioned sequence of production steps applies to the U-shaped elements 7, the star point wires 11, and the phase wires 12 in a corresponding way.

FIG. 2b shows a star point wire 11 that also has the wedge shape 13 stamped onto it. The star point wire 11 has an end piece that is bent at a 90° angle in relation to the rest of the wire and is integrally attached to a star point ring during the manufacture of the winding.

In addition, FIG. 2c shows a phase wire 12 that also has the wedge shape 13 stamped onto it, which significantly improves the slot space factor in a winding of an electric machine. The offset of the phase wire 12 shown in FIG. 2c is a result of the shaping of the winding head. First, the phase wires 12, which are embodied as straight, are inserted into an offsetting die. In principle, it is possible for the phase wires 12, which are straight at first, to remain straight during the shaping of the winding head; the phase wire 12 offset depicted in FIG. 2c can be produced in them as a function of the pitch diameter of the offsetting die used.

Figure 3:
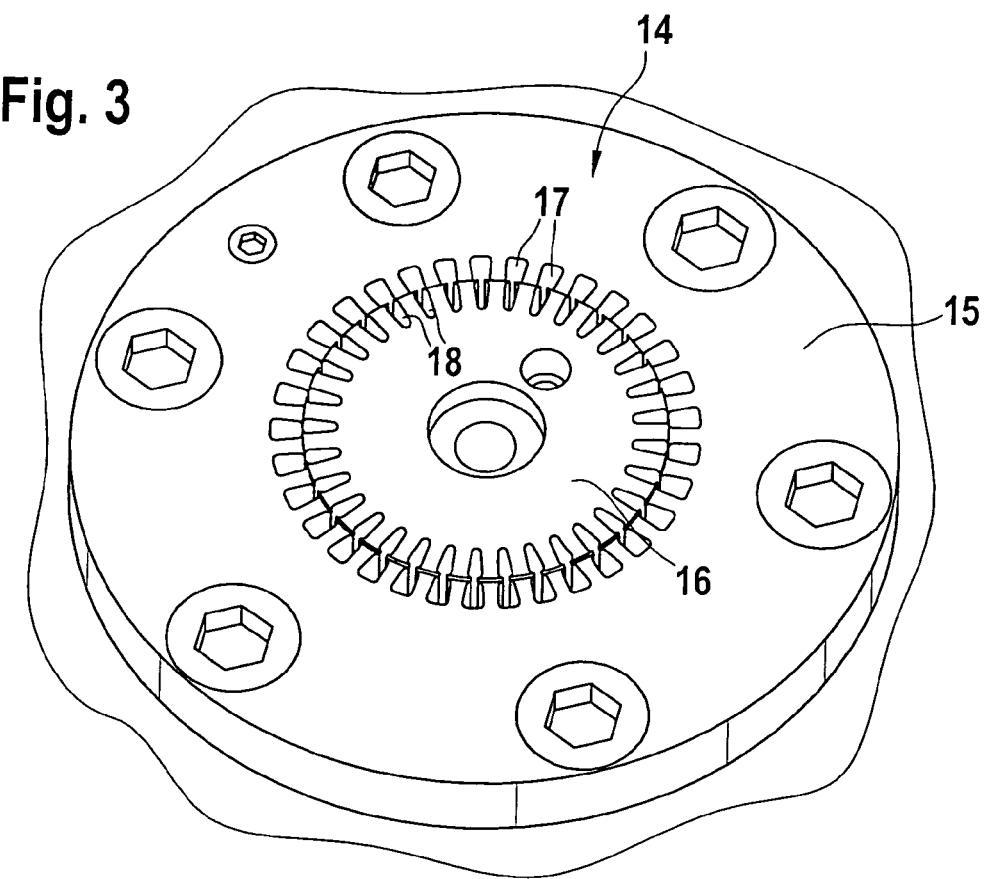
FIG. 3 is a top view of the offsetting die.

FIG. 3 is a top view of an offsetting die.

The offsetting die 14 depicted in FIG. 3 has an outer disk 15 that is stationary and an inner disk 16 that can be rotated in relation to the stationary outer disk 15. It is also possible for both the outer disk 15 and the inner disk 16 of the offsetting die 14 to be mobile. Both embodiment variants of the offsetting die 14 allow a relative movement of an outer disk 15 in relation to an inner disk 16 to occur, which makes it possible to execute a offsetting to shape a winding head.

The inner circumference of the outer disk 15 is provided with first openings 17 that are spaced apart from one another at regular intervals and have an approximately wedge-shaped opening cross section. The outer circumference of the inner disk 16 is provided with second openings 18, which likewise have an approximately wedge-shaped opening cross section and are spaced apart from one another at intervals identical to the spacing of the first openings 17 on the inner circumference of the stationary outer disk 15. Rotating the inner disk 16 in relation to the stationary outer disk 15 produces an offsetting of U-shaped elements 7 shown in FIG. 2, which are inserted into the first openings 17 and second openings 18.

Figure 4:
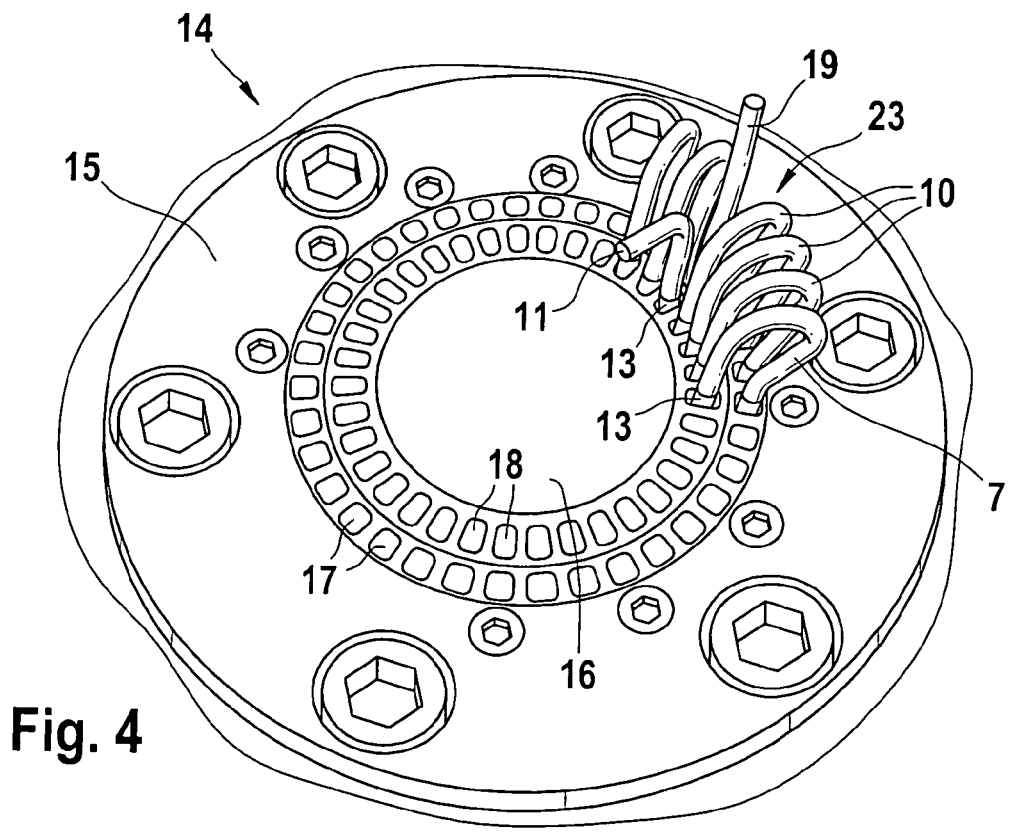
FIG. 4 shows the wire elements, part of which are inserted into a offsetting die for the shaping of the winding head.

FIG. 4 shows an offsetting die into which part of the wire elements are inserted for the shaping of a winding head.

The offsetting die 14 shown in a perspective top view in FIG. 4 is equipped with the stationary outer disk 15 and the inner disk 16 that can rotate in relation to it. The first openings 17 of the stationary outer disk 15 are arranged in a ring around the second openings 18 provided in the outer circumference surface of the inner disk 16. Both the first openings 17 and the second openings 18 have an essentially wedge-shaped cross section that is complementary to the wedge shape 13 of the wire elements 7, 11, and 12 depicted in FIG. 2.

In FIG. 4, the legs of the U-shaped elements 7 are inserted into the first openings 17 and second openings 18 so that their rounded parts 10 are situated on a star point side 23 of a winding yet to be produced. In addition, a star point wire 11 is inserted into a second opening 18 on the outer circumference of the inner disk 16 and its end oriented toward the star point side 23 is bent at an angle. Aligned with the star point wire 11 that has the bent end, a conductor element 19 is inserted into the corresponding first opening 17 on the inner circumference of the stationary outer disk 15. The conductor element 19 is a phase wire. This serves to supply current to the winding of the 3-phase winding or rectangular wire winding to be produced; using a rigid, thick wire as a conductor element 19 offers the possibility of embodying the current connection of the finished winding directly on this conductor element, e.g. in the form of a plug contact.

Figure 5:
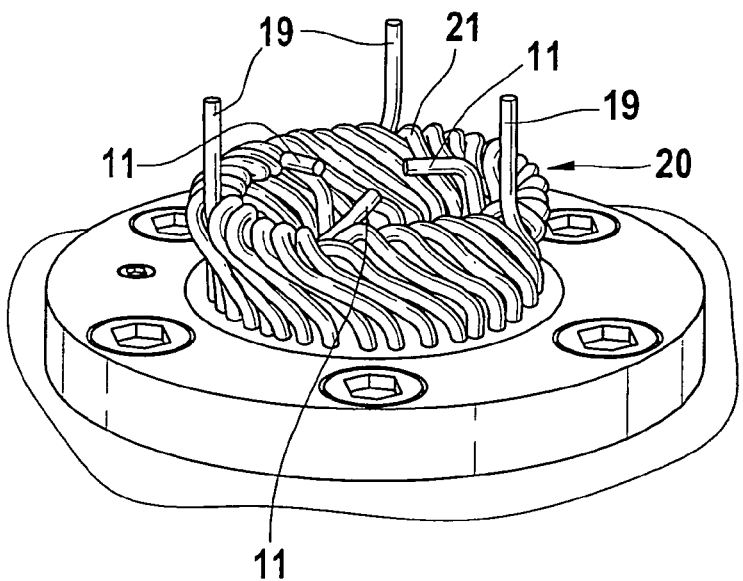
FIG. 5 shows a finished shaped winding head with an integrated star point.

FIG. 5 shows a finished shaped winding head with an integrated star point.

After the U-shaped elements 7 are inserted into the corresponding openings 17 and 18 in the outer disk 15 and inner disk 16, an offsetting of the U-shaped elements 7 occurs, i.e. the two legs of the U-shaped elements 7 contained in the offsetting dies 14 are moved in relation to each other. FIG. 5 is a perspective top view of the resulting winding head 20. The winding head 20 has an integrated star point 21, which is produced in a single work step with the offsetting of the U-shaped elements 7 inserted into the openings 17 and 18. The bent ends of the star point wires 11 point toward one another in the shape of a star. In FIG. 5, the wire basket produced during the offsetting is still enclosed in the offsetting die 14 and is not shown. The conductor elements 19 that will supply current to the finished winding are situated on the outside of the winding head 20, opposite the individual star point wires 11. The shape of the winding head 20 shown in FIG. 5 is the result of an offsetting, i.e. a relative movement of the inner disk 16 and outer disk 15 of the offsetting die 14 in accordance with a winding template.

Figure 6:
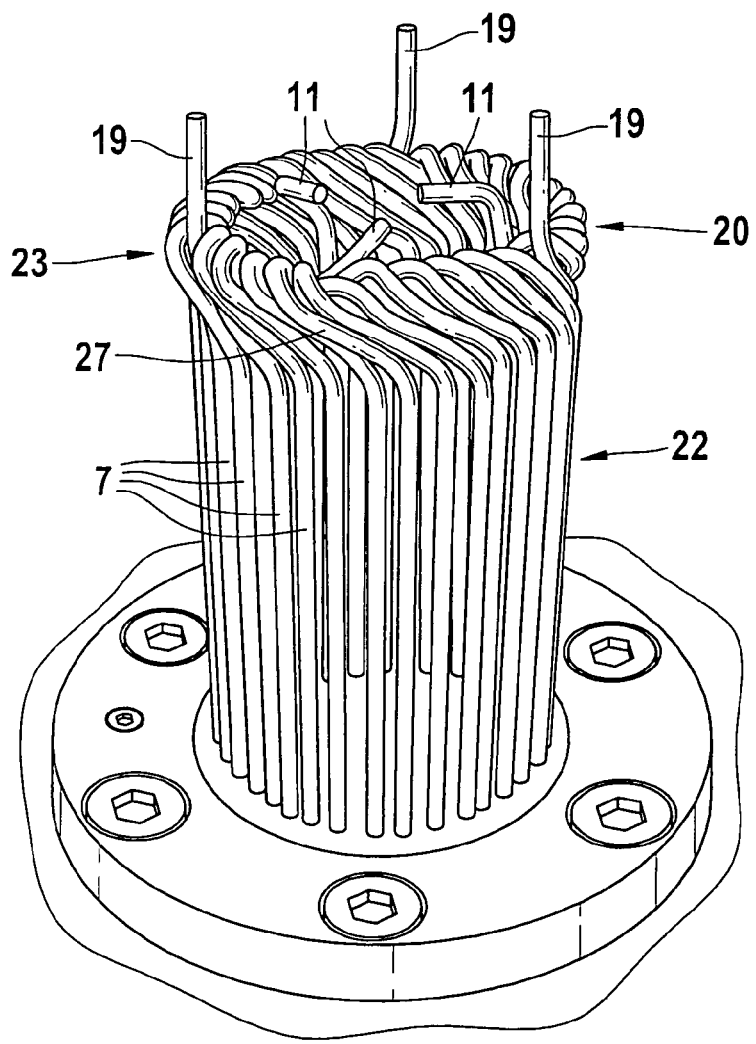
FIG. 6 shows an ejected wire basket for insertion into a laminated core.

FIG. 6 shows a wire basket that has been ejected from a die and is ready to be inserted into a laminated core of an electric machine.

The depiction according to FIG. 6 shows the winding head 20 on the star point side 23 of a wire basket 22. Offset winding wires 27 that have a wedge-shaped cross section are depicted underneath the winding head 20. The circumference surface of the wire basket 22 is comprised of the U-shaped elements 7 whose upper region underneath a rounded part 10 is provided with an offset 27; beneath the offset 27, the U-shaped elements 7 extend essentially vertically in relation to one another. On the star point side 23 of the winding head 20, the star point wires 11 are depicted, whose ends point toward one another and are connected to one another by means of a star point ring that is not shown in FIG. 6. The conductor elements 19 that will later supply current to the as yet unfinished winding are situated on the outside of the winding head 20, arranged opposite the star point wires 11.

Figure 7:
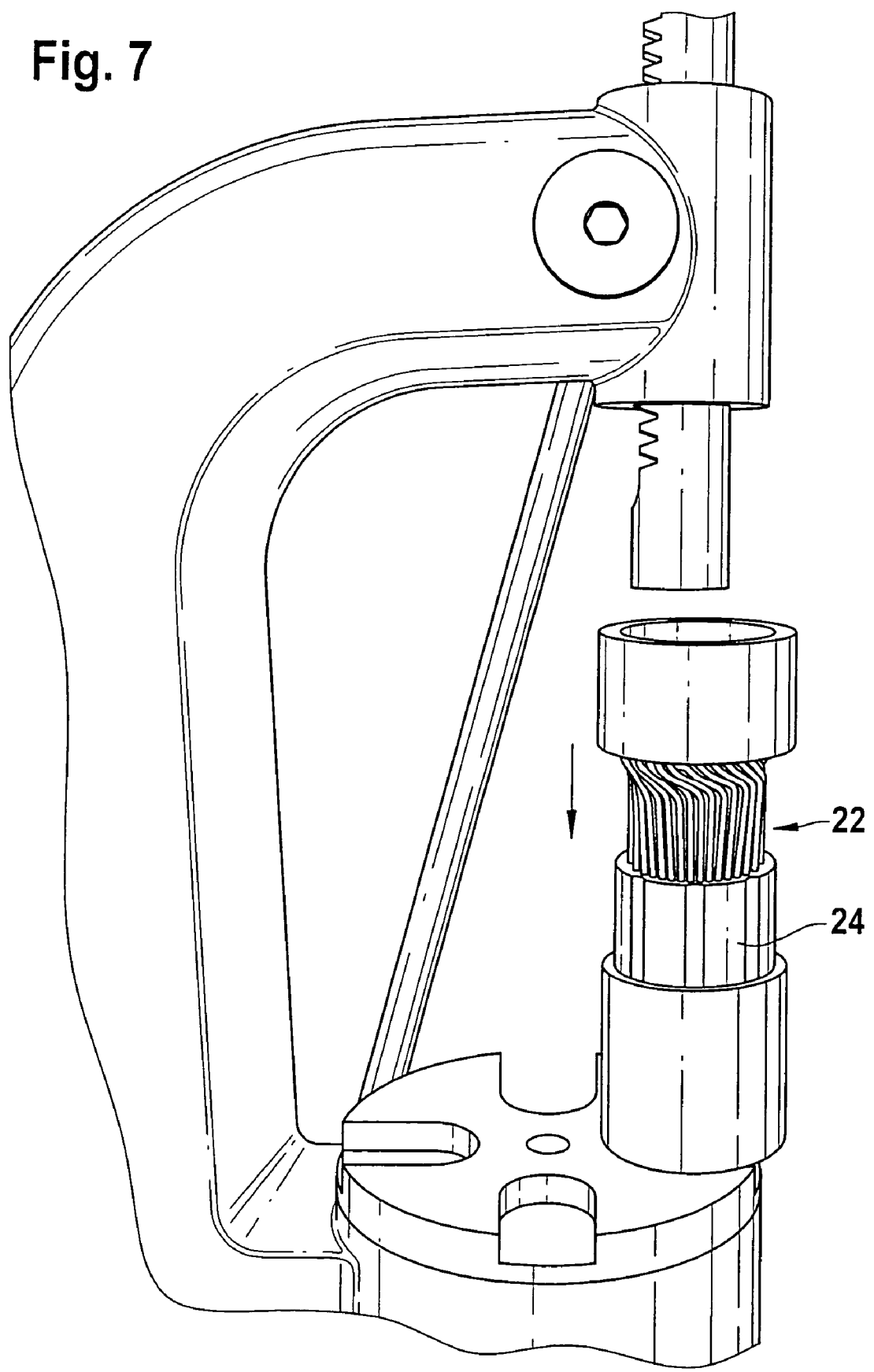
FIG. 7 shows the step in which the wire basket and the laminated core are joined.

FIG. 7 shows the process in which the wire basket and the laminated core of an electric machine are joined to each other.

An insertion device that is only indicated schematically in FIG. 7 is equipped with a die, which, with the interposition of a transmitting element, slides the wire basket 22 in the direction of the arrow into a laminated core. The transmitting element is placed onto the star point side 23 of the wire basket 22 in order to protect the winding head 20 of the star point 21 integrated into it and in order to protect the conductor elements 19. The laminated core 24 can already be provided with a paper insulation; it is also possible for the insulation to be provided by means of a powder-coating process. In the joining procedure according to FIG. 7, the laminated core 24 is insulated by means of one of the above-mentioned insulation methods.

Figure 8:
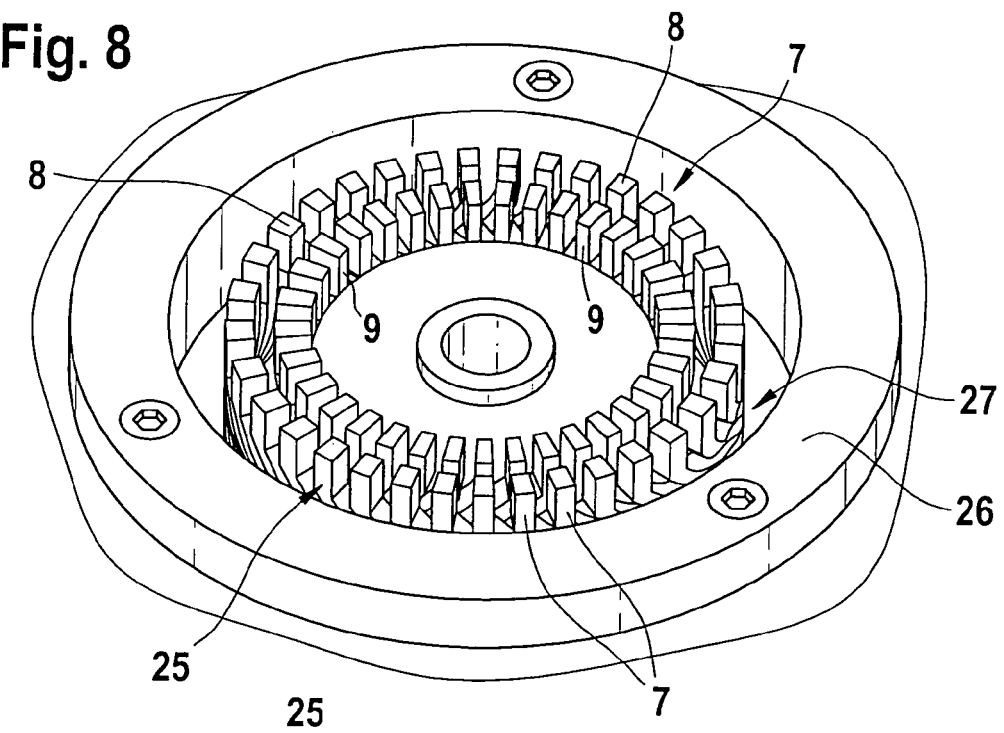
FIG. 8 shows the offsetting die on the connection side of the winding.

FIG. 8 shows the connection side of the winding.

The top view according to FIG. 8 shows that on the connection side 25 of the winding, the first wire ends 8 and the second wire ends 9 of the U-shaped elements 7 are arranged opposite one another. Offset winding wires 27 are situated underneath the wire ends 8 and 9, which lie in an essentially flat plane. The offsetting on the connection side 25 of the winding is produced by means of a relative movement of the offsetting die 14 in relation to a stationary part of the offsetting die 26; the legs of the U-shaped elements 7, not shown in FIG. 8, which extend parallel to each other and are connected by the rounded part 10 on the star point side 23 of the winding, essentially pass through this offsetting die 26.

Figure 9:
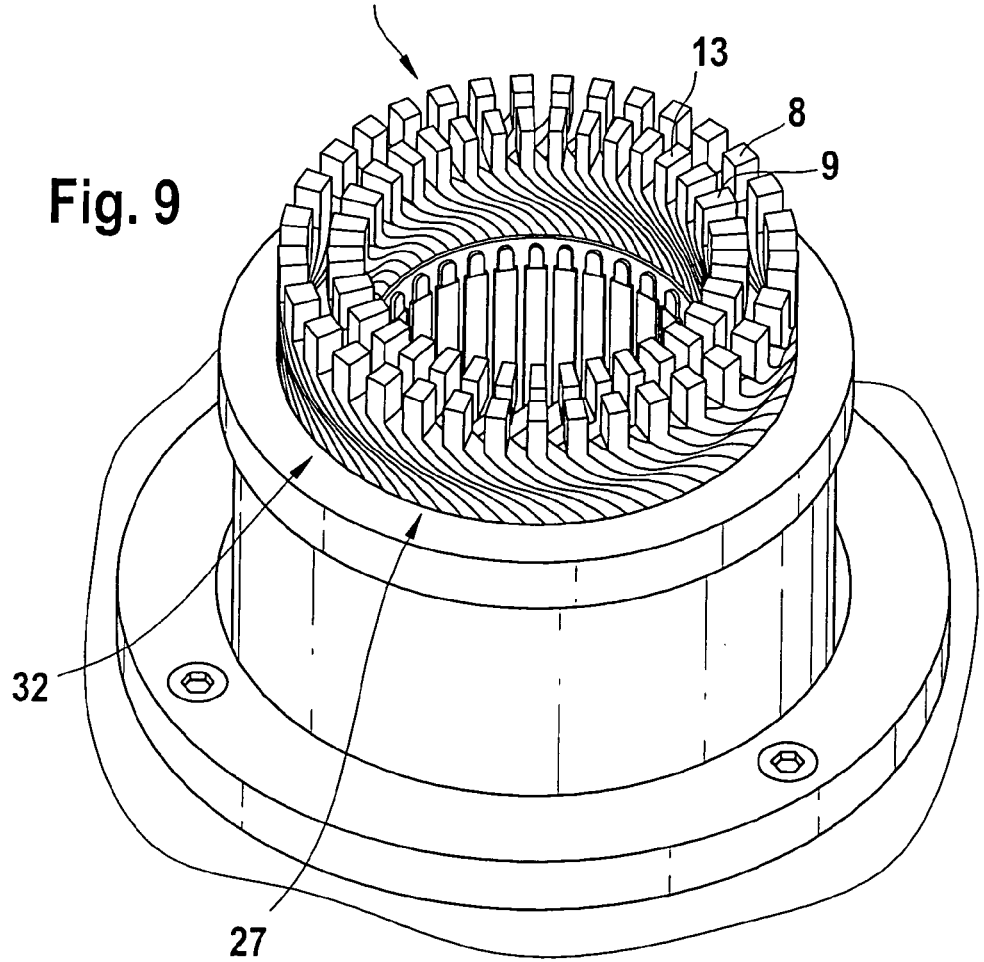
FIG. 9 shows the connection side of the winding.

FIG. 9 shows the offsetting socket the connection side of the winding.

On the connection side 25 of the finished winding 32, the ends 8 and 9 of the offset winding wires 27 are arranged opposite one another in two concentric circles. The U-shaped elements 7 also have a wedge-shaped cross section 13 inside the offset section on the connection side 25 of the winding 32.

Figure 10:
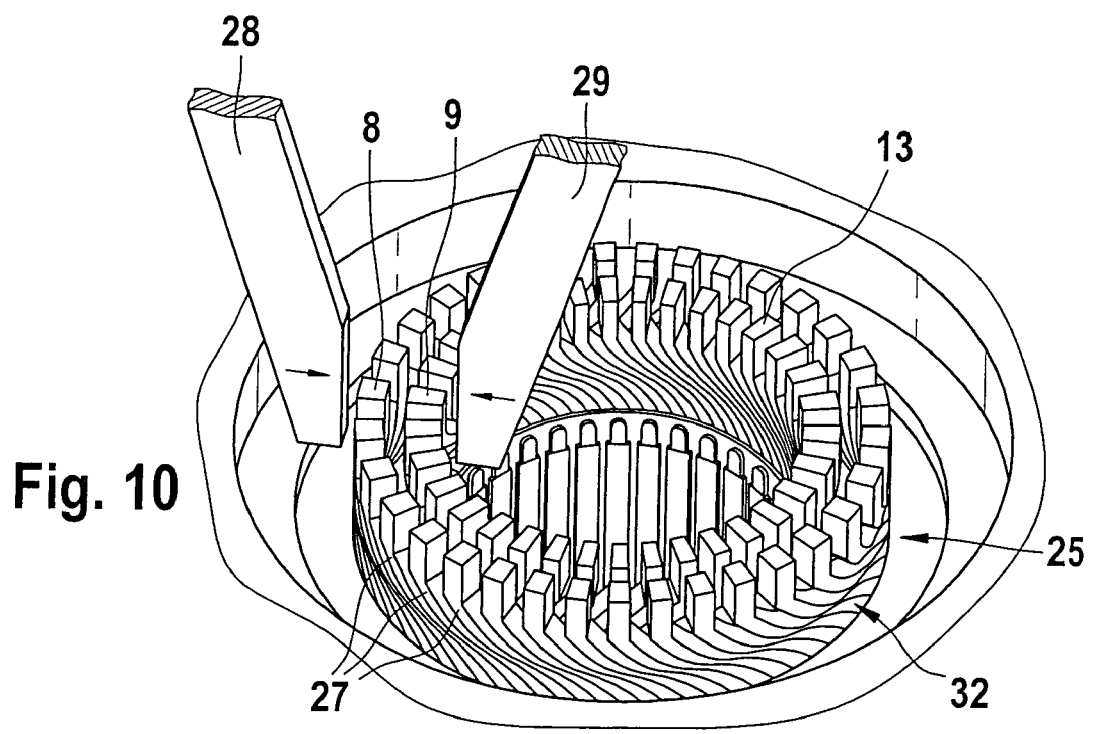
FIG. 10 shows the integral connection on the connection side.

FIG. 10 shows the production of the integral connection on the connection side of the winding 32.

In the depiction in FIG. 10, the connection side 25 of the winding 32 protrudes out from the offsetting socket. The offset winding wires 27 have the wedge-shaped cross section 13 produced in the stamping die 1 according to FIG. 1. The first wire ends 8 and second wire ends 9 of the U-shaped elements 7 are spaced apart from each other on the connection side 25. A first jaw 28 and a second jaw 29 opposite from it squeeze the ends 8 and 9 of each U-shaped element 7 toward each other before an integral connection is produced on the connection side 25 of the winding 32.

Figure 11:
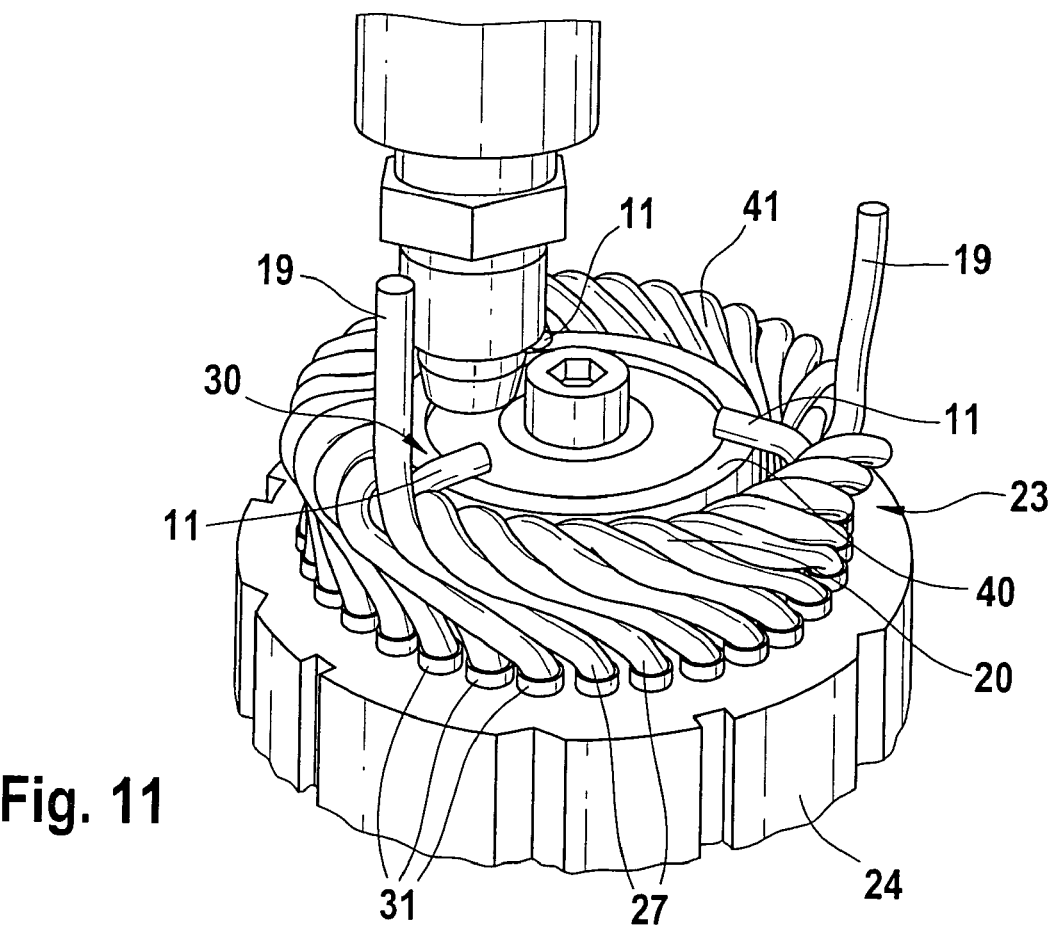
FIG. 11 shows the welding of the star point on the star point side of the winding, FIGS. 12a, 12b, 12c respectively show a top view, side view, and enlarged detail of the star point side of a first winding variant, FIGS. 13a, 13b, 13c respectively show a top view, side view, and enlarged detail of the star point side of a second winding variant, and FIGS. 14a, 14b, 14c respectively show a top view, side view, and enlarged detail of the star point side of a third winding variant.

FIG. 11 shows the production of an integral connection on the star point side 23 of the winding.

The winding head 20 of the winding encased by the laminated core 24 is situated on the star point side 23. On the inside of the winding head 20, the bent ends of three star point wires 11 point toward one another. The individual bent ends of the star point wires 11 are integrally attached to a star point ring 40. The integral attachment of the bent ends of the star point wires 11 to the star point ring 40 can be produced by means of resistance welding, laser welding, electron beam welding, or soldering; it is also possible to use cold forming attachment techniques to attach the bent ends of the star point wires 11 to the star point ring 40. Hot pressing can achieve an automatic contacting of the bent ends of the phase wires 11 with the star point ring 40, thus yielding the integrated star point 21. Protruding from the connection side 23 of the winding head 20, next to the bent ends of the star point wires 11, the conductor elements 19 extend upward from the surface of the winding head 20.

The depiction in FIG. 11 also shows that beneath the offset winding wires 27 of the winding, the wires are encompassed by insulation 31. The insulation 31, which is produced or example by means of powder coating or in the form of paper tubes, is provided inside the laminated core 24 before the execution of the procedure joining the wire basket 22 (see FIG. 7) to the prefabricated laminated core 24.

The positioning of the star point ring 40 above the winding head 20 makes it advantageously possible for the inner diameter of the laminated core 24 to not require any reduction. Due to the positioning of the star point ring 40 on the inside 41 of the winding head 20, it is also possible to reduce the structural length of the finished winding 32. Another advantage is that no additional insulation elements such as plastic masks or insulating paper are required.

Figure 12A:
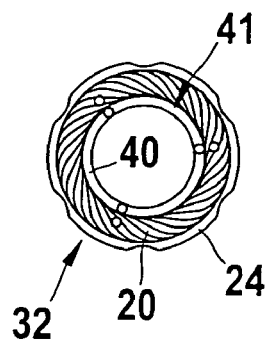
Figure 12B:
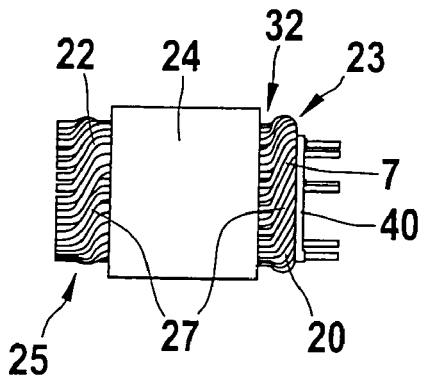
Figure 12C:
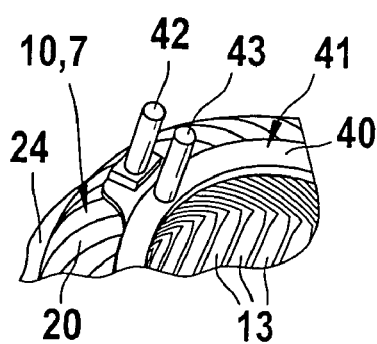

FIGS. 12a, 12b, 12c; 13a, 13b, 13c; and 14a, 14b, 14c show different embodiment variants of windings 32 manufactured using the method proposed according to the present invention.

These windings 32 can be used, for example, in electric machines such as asynchronous motors designed for use in the low-voltage range. With regard to their use in motor vehicles, electric machines embodied in the form of asynchronous motors can be used as steering motors, fan drives, hydraulic drives, and actuating drives. Asynchronous motors whose windings have been manufactured using the above-described method can also be used as drive units for forklifts or other factory trucks.

Figure 13A:
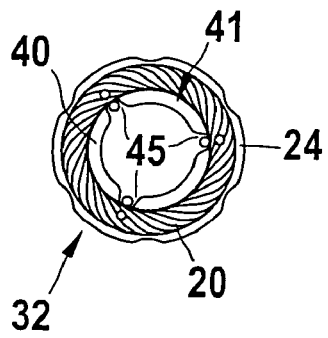
Figure 13B:
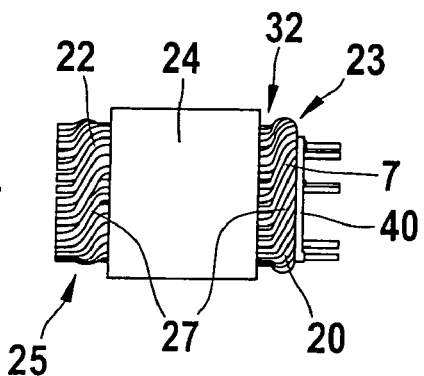
Figure 13C:
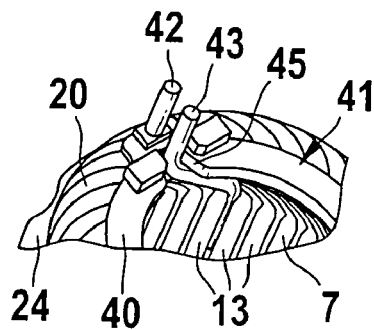
Figure 14A:
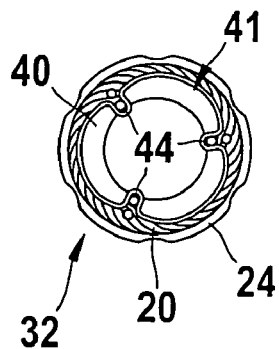
Figure 14B:
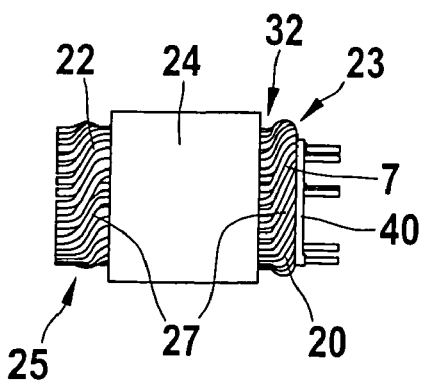
Figure 14C:
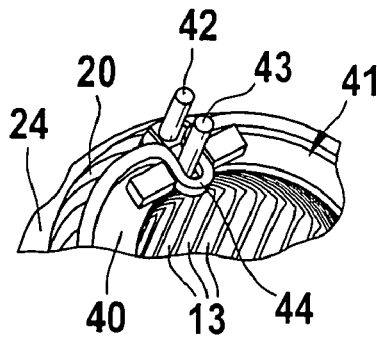

A top view, side view, and enlarged detail of the star point side are shown for a first variant in FIGS. 12a, 12b, and 12c, for a second variant in FIGS. 13a, 13b, and 13c, and for a third variant in FIGS. 14a, 14b, and 14c.

In each of the embodiment variants shown in a top view in FIGS. 12a, 13a, and 14a, the laminated core 24 encloses the winding 32. The star point ring 40 is always positioned on the inside 41 of the winding head 20 thus permitting an advantageous reduction in the structural length of the winding 32.

In the embodiment variant according to FIG. 13a, the star point ring 40 is provided with three recesses 45 spaced apart from one another by 120°, whereas in the embodiment variant depicted in the top view, the star point ring 40 is provided with individual loops 44 also spaced apart from one another by 120°. In all of the embodiment variants shown in a top view in FIGS. 12a, 13a, and 14a, the star point ring 40 is positioned with its integral connection above the winding head 20 so that it is not necessary to reduce the inner diameter of the laminated core 24 encompassing the winding 32.

The side views of the embodiment variants of the winding 32 shown in FIGS. 12b, 13b, and 14b demonstrate that the winding 32 is encompassed by the laminated core 24 between the star point side 23 and the connection side 25. Offset winding wires 27 are visible on both the connection side 25 and on the star point side 23. The laminated core 24 encompasses the winding 32 essentially in the region in which the U-shaped elements 7 extend strictly parallel to one another in the wire basket 22. On the star point side 23, the star point ring 40 is shown situated on the inside of the winding head 20. The windings 32 are embodied analogously in the side views in the figure sequences B and C.

The individual embodiment variants of the winding 32 depicted in FIGS. 12a, 12b, 12c; 13a, 13b, 13c; and 14a, 14b, 14c differ from one another in the embodiment of the star point ring 40.

According to FIG. 12c, the star point ring 40 is situated against the winding head 20, which is encompassed by the laminated core 24 and is comprised of the rounded parts 10 of the U-shaped elements 7. A second connection 43 is provided on this star point ring 40 opposite which a first connection 42 is provided. The first connection 42 according to FIG. 12c corresponds to the conductor element 19, which serves to supply current to the winding 32.

The enlarged detail shown in FIG. 13c shows that the star point ring 40 encompasses the second connections 43 in the region of recesses 45 provided in the star point ring 40. The rounded parts 10 of the U-shaped elements 7 constitute the top of the winding head 20. The laminated core 24 encompasses the outside of the winding 32. This perspective view clearly depicts the wedge shape 13 of the U-shaped elements 7.

The enlarged detail of the winding 32 according to FIG. 14c shows that the second connections 43 are encompassed by loops 44, which encompass the outside of the star point ring 40 like a belt. The laminated core 24 encompasses the outside of the winding. The second connection 43 is aligned with a first connection 42 that corresponds to the conductor element 19 for supplying current to the winding 32. The two connections 42, 43 are spaced apart from each other in the radial direction. The enlarged details of the figure sequence A, B, and C show that the star point ring 40, the star point ring 40 with recesses 45, and the star point ring 40 whose outside is encompassed by a ring with loops 44, respectively, rest against the inside 41 of the winding head 20. This achieves a significant reduction in the structural length of the winding 32 manufactured according to the present invention.

On the one hand, the winding 32 described above features a high slot space factor due to the wedge shape 13 stamped onto the U-shaped elements 7, 11, and 20. In addition, the manufacture of the winding 32 can be automated and in a particularly advantageous way, the interconnection of an integrated star point 21 can take place during production of the winding 32. The method proposed according to the present invention also makes it possible to automate the interconnection of the integrated star point 21. Furthermore, the winding 32 with the integrated star point 21 features a compact design with a minimized structural volume.

REFERENCE NUMERAL LIST 1 stamping die
2 hydraulic piston
3 wire material in rod form
4 first shaping part
5 second shaping part
6 material inlet
7 U-shaped element
8 first wire end
9 second wire end
10 rounded part
11 star point wire
12 phase wire
13 wedge shape
14 offsetting die
15 outer disk
16 inner disk
17 first openings
18 second openings
19 conductor element for supplying current to winding 32
20 winding head
21 integrated star point
22 wire basket
23 star point side
24 laminated core
25 connection side
26 offsetting die 27 offset winding wires
28 first jaw
29 second jaw
30 star point side weld
31 insulation
32 winding
40 star point ring
41 inside of winding head
42 first connection
43 second connection
44 loop
45 recess

What is claimed is:

1. A method for manufacturing multiphase windings of an electric machine with the following process steps:
   a) deforming a cross section of elongated wire elements by stamping a cross-sectional profile of said wire elements to increase a slot space factor;
   b) loading offsetting dies with some of the stamped wire elements to constitute a winding, with other of the stamped wire elements to constitute an integrated star point, and with further of the stamped wire elements for supplying current to the winding;
   c) forming a winding head with an integrated star point by simultaneously moving, by means of the offsetting dies, two legs of the some of the stamped wire elements, which are U-shaped, in a circumferential direction that is transverse to a longitudinal direction of the loaded stamped wire elements, arranging the other of the stamped wire elements, which have bent ends, so that their bent ends are orientated radially inwardly toward one another in a shape of a star, and arranging the further of the stamped wire elements on an outside of the winding head opposite to the other of the stamped wire elements;
   d) connecting the bent and radially inwardly oriented ends of the other of the stamped wire elements with a connecting ring, whereby an electrical contacting of the integrated star point is completed, and wherein the connecting ring is disposed radially inwardly on an inside of the winding head.

2. The method as recited in claim 1, wherein said stamping includes stamping a cross-sectional profile in a wedge shape onto the wire elements.

3. The method as recited in claim 1, wherein said stamping includes stamping an oval or circular cross-sectional profile onto the wire elements.

4. The method as recited in claim 1, further comprising loading the offsetting dies with the stamped wire elements in such a way that the other of the wire elements that constitute the integrated star point are offset from one another by an angle of 120°.

5. The method as recited in claim 1, further comprising shaping the winding head by means of an offsetting of the offsetting dies.

6. The method as recited in claim 1, further comprising producing a wire cage and attaching it to a laminated core.

7. The method as recited in claim 6, further comprising providing the laminated core with an insulation in an attachment region of the wire cage.

8. The method as recited in claim 1, further comprising contacting of the some of the stamped wire elements to one another at a contacting end of the winding.

* * * * *